Sept. 5, 1950            F. MULLER            2,521,397
FERMENTING AND RIPENING OF BEER
Filed Jan. 2, 1948
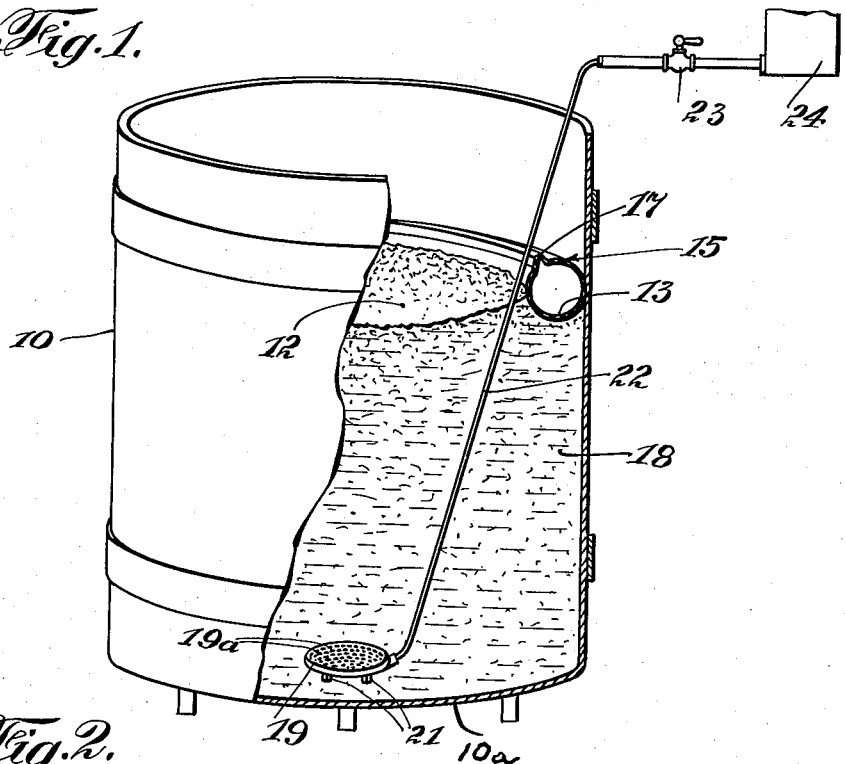
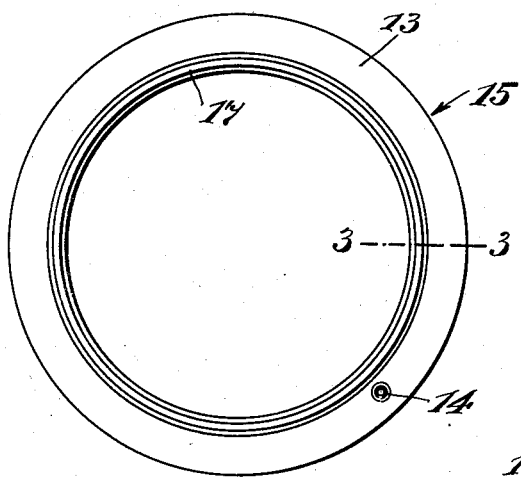
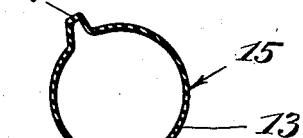
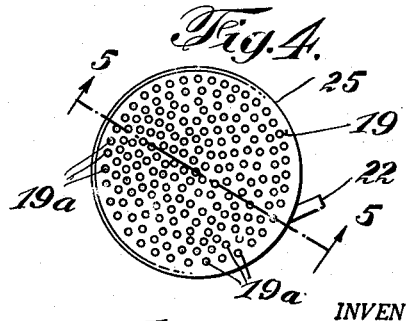
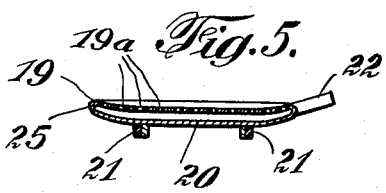
INVENTOR.
Ferdinand Muller
BY C. P. Goepel
his ATTORNEY Patented Sept. 5, 1950

2,521,397

UNITED STATES PATENT OFFICE 2,521,397

FERMENTING AND RIPENING OF BEER

Ferdinand Muller, Elmhurst, N. Y.

Application January 2, 1948, Serial No. 340

8 Claims. (Cl. 99—44)

1

This invention relates to apparatus and methods of fermenting and ripening of beer or the like, and has for its object to provide improved means and an improved method to be used therein.

The objects of my improvements are, first to promote a faster fermentation and ripening of beer. Secondly, to obtain a permanent fermentation head to prevent an abnormal turbulent or boiling fermentation. Thirdly, the provision of a collecting means for preventing coagulated matter from falling back into the tank. Fourthly, the use of $CO_2$ gas at the initial stage of fermentation to rouse the yeast, thus contacting faster with more beer-wort for a controlled attenuation of the beer-wort. The stimulatory effects of the injected fluid saturation on the initiation of maltose fermentation, are of great value if an accelerated fermentation rate is desired. The overall procedure will result in an exacting beer taste, cleaner yeast crops, purer $CO_2$ gas, better separation at initiation of degenerated fermentation matters, thus accelerating the ripening and mellowing of the beer or ale.

The invention consists in means to reduce the upper surface of a liquid in a tank containing the beer being made; in means to collect the overcharge and prevent it from returning to the liquid mass; in the improved replaceable member which is inflatable to press against the inner sides of the tank and embodying the three concepts just mentioned; and finally to combine with the same means to supply a fluid to the tank contents to activate the enzymes and the yeast.

The invention includes the improved method hereinafter described.

The invention will be more fully described hereinafter, embodiments thereof shown in the drawings, and the invention will be finally pointed out in the claims.

In the accompanying drawings,

Fig. 1 is a partly sectional view of a tank with the improvements embodying this invention applied thereto;

Fig. 2 is a plan view of the inflated member;

Fig. 3 is a section taken on line 3—3 of Fig. 2;

Fig. 4 is a plan view of a perforated plate for the passage of the injected fluid;

Fig. 5 is a section view of Fig. 4, taken on line 5—5 of Fig. 4.

Similar characters of reference indicate corresponding parts throughout the various views.

Referring to the drawings, and more particularly to Fig. 1, the tank 10 of circular shape has an open top and contains the beer in the making having a level or upper surface indicated by 12. Upon this surface rides a member 15. This, in

2 the embodiment shown, is a tube 13 of rubber or other suitable material, much like an inner tube of an auto tire, which may be inflated or deflated by means of a valve or the like 14 in the manner well known. The outer diameter is such that when the tube is inflated the outer surface of the tube will press against the inner surface of the tank to provide a sealing effect by such contact. The diameter of the tube itself is such that a substantial area of annular shape of the upper level 12 is covered. The upper surface of the tube is provided with a circumferential ridge or flange 17 directed generally radially inwards.

The contact of the tube 13 with the tank wall permits the rising or lowering of the tube 13 with the rising or lowering of the upper level or surface.

This distensible annular elastic float 15 floats on the liquid fermentate. The ridge 17 prevents coagulated matters from falling back into the liquid mass 18.

A perforated disk 19 over a solid backing 20 is placed on the bottom of the tank and has legs 21 formed by a rubber washer to space it from the bottom 10a. Into the space between the backing 20 and the perforated disk 19, a pipe 22 feeds $CO_2$, which is dispersed into the liquid in the tank. The pipe 22 extends, conveniently, through the upper part of the tank 10 to a valve 23 controlling the supply from a storage tank 24.

Preferably, but without limitation, the disk 19 has a diameter of 16 in., with a peripheral margin 25 raised about 1 in. The diameter of the tube 13 is 12 in., which depends on the rise of the tank 10 of an average of 10 to 16 feet diameter. The pipe 22 has a diameter of ¼ in. The perforations 19a are $\frac{1}{16}$ in. with ½ in. separation. The disk 19 is preferably of aluminium. The tube 13 is of rubber or the like, that is, of any suitable material which will allow of easy sterilization by brewers' antiseptic solutions.

The herein described equipment and application will result in finer tasting beers, safeguard the vitality of the yeast and its consistency, thus a more regular attenuation power is maintained; the beer or ale will ripen in a shorter period due to controlled contact of yeast and $CO_2$ gas with the beer; the equipment will protect the fermentation against abnormal or boiling fermentation; the skimming is centralized and can be lifted more exactly; said equipment and parts can easily be cleaned and kept sterile in antiformin solution of 1–2%; in emergency this equipment permits immediate re-propagation of the next brew by removing the chamber-tube for cleaning and re-inflating when the beer level has reached the usual height in the fermenter. Initial rousing is done by a long paddle when 3 inches of wort are in the fermenter; the overall time spent on cleaning fermenters and cellars is considerably reduced, due to cleaner skimming procedure.

By the use of an inflated float a stronger fermentation head is produced, thus preventing the $CO_2$ gas to cause turbulent or boiling fermentation; the float, restricting the surface area and tension of the fermenting liquid, is of advantage, as it facilitates the removing of fermentation scum, consisting of oxidized hop resins and proteolytic matters. By such exact skimming a cleaner taste of the final product is obtained; the strong fermentation cover formed due to the float will retain the fine, initial hop flavored $CO_2$ gas much better and recombine upon cooling with the beer and the alcohol formed; admitting $CO_2$ gas for a short period through the $CO_2$ saturator at the initial stage of fermentation, will rouse the yeast, also have a stimulatory effect on co-enzymes in a pH adjusted maltose fermentation, thereby increasing the rate of fermentation and attenuation of the beer; the overall procedure, with the use of this equipment, consisting of a fermenter vat, described float and saturator will produce a finer taste in beer, cleaner yeast crops, thereby safeguarding its vitality. Since the maltose fermentation is stimulated by the action of saturation, fermentation proceeds more rapidly, evolving a stronger hop impregnated $CO_2$ gas, thus improving and amplifying the fine hop aroma of beer.

The displacement caused by the float will restrict the surface area thus aiding for a better $CO_2$ retention and the reduction of the oxidation of fermentation scum, which consists of foam impregnated with hard hop resins and degenerated proteolytic matters.

I wish it to be understood that I do not desire to be limited to the exact details of construction shown and described, for obvious modifications will occur to a person skilled in the art.

I claim:

1. The process of fermenting beers in a fermentation zone, comprising reducing the surface area of the fermentate by floating thereon an annular float, the outer periphery of said float covering the periphery of the fermentate, and the inner periphery of said float controlling the exposed surface area of said fermentate.

2. The process of fermenting beers in a fermentation zone, comprising reducing the surface area of the beer in said fermentation zone by floating thereon a distensible annular elastic float controllable as to size, said outer periphery of said float being regulated to contact the inner wall of the fermentation zone, and said inner periphery of said float being adapted to be regulated in size to control the surface area of the fermentate.

3. The process of fermenting beers in a fermentation zone, comprising reducing the surface area of the beer in said fermentation zone by floating thereon a distensible annular elastic float controllable as to size, said outer periphery of said float being regulated to contact the inner wall of the fermentation zone, said inner periphery of said float being adapted to be regulated in size to control the surface area of the fermentate, and agitating the fermentate by introducing a fluid into the bottom of the fermentate.

4. In an apparatus for fermenting and ripening of beers, the combination of a fermentation tank, adapted to hold beer or ale during fermentation, an annular float therein and adapted to float upon the surface of the liquid fermentate therein and contacting the walls of the tank, whereby the surface of the liquid may be controlled in the area enclosed by the inner margin of the float.

5. In an apparatus for fermenting and ripening of beers, the combination of a fermentation tank, adapted to hold beer or ale during fermentation, a distensible annular elastic float therein and adapted to float upon the surface of the liquid fermentate therein and contacting the walls of the tank, whereby the surface of the liquid may be controlled in the area.

6. In an apparatus for fermenting and ripening of beers, the combination of a fermentation tank, adapted to hold beer or ale during fermentation, a distensible annular elastic float therein and adapted to float upon the surface of the liquid fermentate therein and contacting the walls of the tank, said float having an upwardly extending ridge on the upper surface thereof, whereby the surface of the liquid may be controlled in the area, and the ridge prevents coagulated resin matters from falling back into the liquid.

7. In an apparatus for fermenting and ripening of beers, the combination of a fermentation tank, adapted to hold beer or ale during fermentation, a distensible annular elastic float therein and adapted to float upon the surface of the liquid fermentate therein and contacting the walls of the tank, whereby the surface of the liquid may be controlled in the area, and means supplying a fluid to the liquid in the lower part of the tank to rouse the yeast.

8. The process of fermenting and ripening beer in a fermentation zone, for increasing the fermentation of the fermentate in a vat having its upper level exposed to atmospheric pressure, which consists in subjecting a fermentate head along the upper level of said vat contents of an area corresponding to that of the vat, to a reduced surface area of the purpose of reducing the surface tension of the fermentate in said reduced surface area, by floating thereon an annular float, the outer periphery of said float covering the periphery of the fermentate, and the inner periphery of said float controlling the exposed surface area of said fermentate, and subjecting the reduced surface area to a movement over said float, said float preventing coagulated matters from falling back into the fermentate.

FERDINAND MULLER.

REFERENCES CITED

The following references are of record in the file of this patent:

UNITED STATES PATENTS

| Number | Name | Date |
| --- | --- | --- |
| 45,406 | Hammer | Dec. 13, 1864 |
| 653,387 | King | July 10, 1900 |
| 1,735,461 | Haupt | Nov. 12, 1929 |